(12) United States Patent
Kondo

(10) Patent No.: US 10,967,574 B2
(45) Date of Patent: Apr. 6, 2021

(54) LASER ADDITIVE MANUFACTURING APPARATUS AND LASER ADDITIVE MANUFACTURING METHOD

(71) Applicant: DMG MORI Company Limited, Yamatokoriyama (JP)

(72) Inventor: Masaki Kondo, Yamatokoriyama (JP)

(73) Assignee: DMG MORI Company Limited, Nara (JP)

( * ) Notice: Subject to any disclaimer, the term of this patent is extended or adjusted under 35 U.S.C. 154(b) by 264 days.

(21) Appl. No.: 16/204,221

(22) Filed: Nov. 29, 2018

(65) Prior Publication Data
US 2019/0168454 A1 Jun. 6, 2019

(30) Foreign Application Priority Data
Dec. 4, 2017 (JP) .............................. JP2017-232687

(51) Int. Cl.
| | |
|---|---|
| *B29C 64/268* | (2017.01) |
| *G02B 27/09* | (2006.01) |
| *G02B 26/10* | (2006.01) |
| *G02B 27/30* | (2006.01) |
| *B33Y 30/00* | (2015.01) |
| *B33Y 10/00* | (2015.01) |
| *B22F 10/00* | (2021.01) |

(Continued)

(52) U.S. Cl.
CPC ............ *B29C 64/268* (2017.08); *B22F 10/00* (2021.01); *B33Y 10/00* (2014.12); *B33Y 30/00* (2014.12); *G02B 26/10* (2013.01); *G02B 27/0944* (2013.01); *G02B 27/0955* (2013.01); *G02B 27/30* (2013.01); *B22F 10/10* (2021.01); *B29C 64/153* (2017.08); *B29C 64/286* (2017.08)

(58) Field of Classification Search
USPC ........................................................ 700/119
See application file for complete search history.

(56) References Cited

U.S. PATENT DOCUMENTS

| 6,433,301 B1 * | 8/2002 | Dunsky ............. B23K 26/0732 |
| | | 219/121.67 |
| 2003/0155693 A1 | 8/2003 | Farnworth et al. |

(Continued)

FOREIGN PATENT DOCUMENTS

| CN | 101148760 A | 3/2008 |
| JP | H0732173 A * | 2/1995 |

(Continued)

*Primary Examiner* — Mohammad Ali
*Assistant Examiner* — Joshua T Sanders
(74) *Attorney, Agent, or Firm* — The Webb Law Firm

(57) ABSTRACT

A laser additive manufacturing apparatus and a method thereof are provided. The apparatus includes an irradiation unit that irradiates an irradiation region with a laser beam having a light intensity distribution converted by a diffractive optical element, a head having a material supplying unit for supplying powder material to the irradiation region, and a movement mechanism which relatively moves the head and a workpiece. In the irradiation region, irradiation light forms a substantially circular spot having a light intensity distribution in which light intensity in an outer peripheral portion is higher than light intensity in a central portion, and the central portion has predetermined light intensity, and the material supplying unit supplies the powder material to the substantially circular spot.

9 Claims, 5 Drawing Sheets

(51) Int. Cl.
*B29C 64/286* (2017.01)
*B29C 64/153* (2017.01)
*B22F 10/10* (2021.01)

(56) References Cited

U.S. PATENT DOCUMENTS

2017/0182590 A1   6/2017   Goya et al.
2018/0036948 A1   2/2018   Fujishima et al.

FOREIGN PATENT DOCUMENTS

| JP | H732173 A | 2/1995 |
| JP | 2003500220 A | 1/2003 |
| JP | 2015155110 A | 8/2015 |
| JP | 2015196163 A | 11/2015 |
| KR | 1020160065442 A | 6/2016 |
| WO | 2017115406 A1 | 3/2018 |

* cited by examiner

LASER ADDITIVE MANUFACTURING APPARATUS AND LASER ADDITIVE MANUFACTURING METHOD

CROSS-REFERENCE TO RELATED APPLICATION

This application claims priority to Japanese Patent Application No. 2017-232687 filed Dec. 4, 2017, the disclosure of which is hereby incorporated in its entirety by reference.

BACKGROUND

Technical Field

The present disclosure relates to a laser additive manufacturing apparatus and a laser additive manufacturing method for forming a deposition on a workpiece by scanning a workpiece while supplying a laser beam and powder material.

Related Art

Laser additive manufacturing in which a workpiece is scanned while supplying a laser beam and powder material to form a deposition on the workpiece has gradually spread. At this time, a typical laser beam has light intensity with a Gaussian distribution in an irradiation region, so that a central portion of the laser beam has high energy intensity. This causes a molten pool formed when a material is melted with a laser beam to have nonuniform temperature distribution in which a central portion has a higher temperature than that in a peripheral portion. As a result, solidification cracking or the like may occur in a deposited portion.

In order to cope with this problem, there is proposed a laser overlay welding apparatus which irradiates a workpiece with a laser beam having a so-called top-hat type light intensity distribution in which energy intensity distribution of the concentrated light is uniform (e.g., refer to Patent Document 1). Patent Document 1:JP2015-155110A The laser overlay welding apparatus disclosed in Patent Document 1 irradiates a workpiece with a laser beam to form a substantially circular spot having a top-hat type light intensity distribution. At this time, when the workpiece is scanned in a fixed direction, integrated amount of heat in its central portion is so large to cause increase of temperature in the central portion. Thus, continuous additive manufacturing with multiple back and forth scanning further increases a temperature difference between a central portion of a molten pool and a peripheral portion thereof. The temperature difference between the central portion of the molten pool and the peripheral portion thereof causes a difference not only in melting rate of metal powder, but also in cooling rate of molten metal. This may cause a problem that a void or residual stress occurs to deteriorate quality.

In addition, even if a top-hat type light intensity distribution is applied, supplied metal powder is irradiated with a laser beam having high energy density just before being poured into a molten pool, thereby generating plasma that will block the laser beam. Accordingly, it causes a problem that a size of the molten pool is changed, and a uniform deposition cannot be formed.

SUMMARY OF DISCLOSURE

It is an object of the present disclosure to solve the above problem, and to provide a laser additive manufacturing apparatus and a laser additive manufacturing method, capable of forming a uniform deposition in high quality, with high efficiency, even in continuous additive manufacturing using a laser beam having high energy density.

To solve the above problem, a laser additive manufacturing apparatus according to an aspect of the present disclosure includes an irradiation unit that irradiates an irradiation region with a laser beam having a light intensity distribution converted by a diffractive optical element, a head having a material supplying unit for supplying powder material to the irradiation region, and a movement mechanism which relatively moves the head and a workpiece, wherein in the irradiation region, irradiation light forms a substantially circular spot having a light intensity distribution in which light intensity in an outer peripheral portion is higher than light intensity in a central portion, and the central portion has predetermined light intensity, and the material supplying unit supplies the powder material to the substantially circular spot.

A laser additive manufacturing method according to an aspect of the present disclosure includes the steps of: causing a laser beam to enter a diffractive optical element; irradiating an irradiation region by emitting from a head a laser beam having a light intensity distribution converted by the diffractive optical element; supplying powder material to the irradiation region from the head; and relatively moving the head and a workpiece, wherein in the irradiation region, irradiation light forms a substantially circular spot having a light intensity distribution in which light intensity in an outer peripheral portion is higher than light intensity in a central portion, and the central portion has predetermined light intensity, and the powder material is supplied to the substantially circular spot from the head.

The above aspect enables providing a laser additive manufacturing apparatus and a laser additive manufacturing method, capable of forming a uniform deposition in high quality, with high efficiency, even in continuous additive manufacturing using a laser beam having high energy density.

DETAILED DESCRIPTION

Figure 1A:
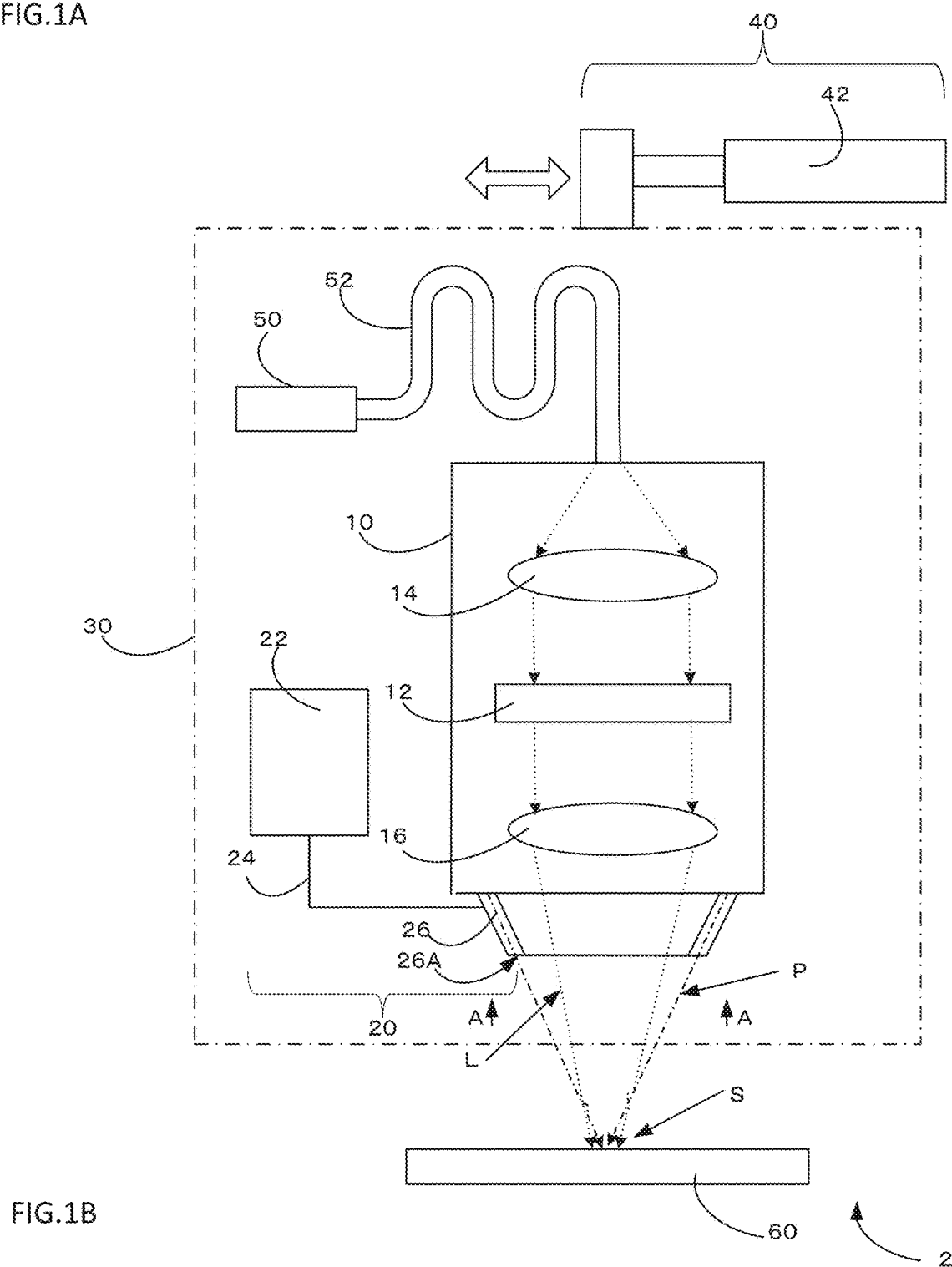
FIGS. 1A and 1B schematically illustrate configuration of a laser additive manufacturing apparatus according to one embodiment of the present disclosure.

Hereinafter, embodiments of the present disclosure will be described with referring to drawings. The embodiments are described below to realize a technical idea of the present disclosure, and the present disclosure is not limited to the description below unless otherwise specified.

In each of the drawings, components each having the same function may be designated by the same reference numeral. In consideration of description of main points or easy understanding, the embodiments may be separately described for convenience. Even this case enables partial substitution or combination of configurations described in different embodiments. In an embodiment described later, description of matters common to a former-described embodiment is omitted, and only differences will be described. In particular, a similar operation effect caused by a similar configuration will not be separately described for each embodiment. Components illustrated in each of the drawings may be exaggerated in size, positional relation, or the like to clarify the description.

(Laser Additive Manufacturing Apparatus According to One Embodiment)

Figure 1B:
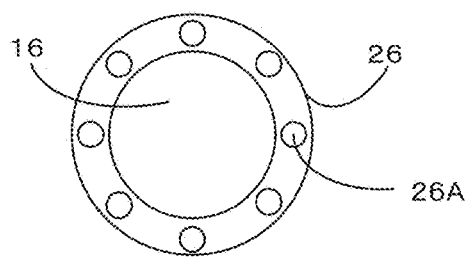
Figure 2A:
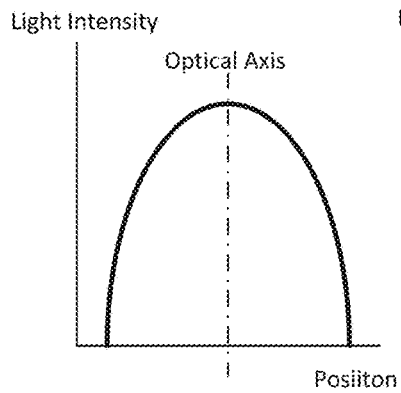
FIGS. 2A to 2C are graphs each schematically illustrating a light intensity distribution of a laser beam for irradiating a workpiece.
Figure 2B:
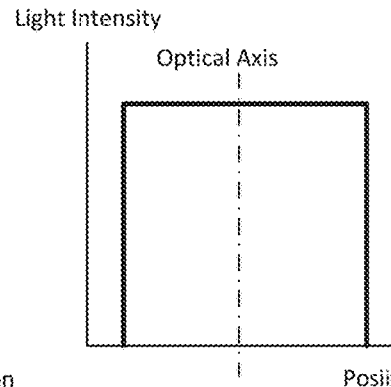
Figure 2C:
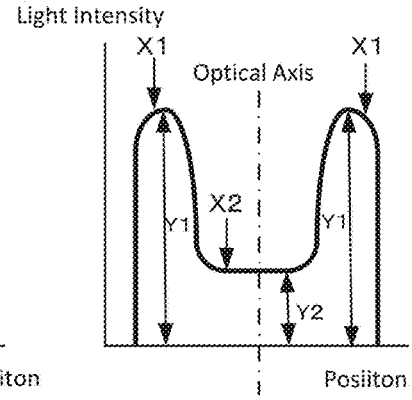
Figure 3:
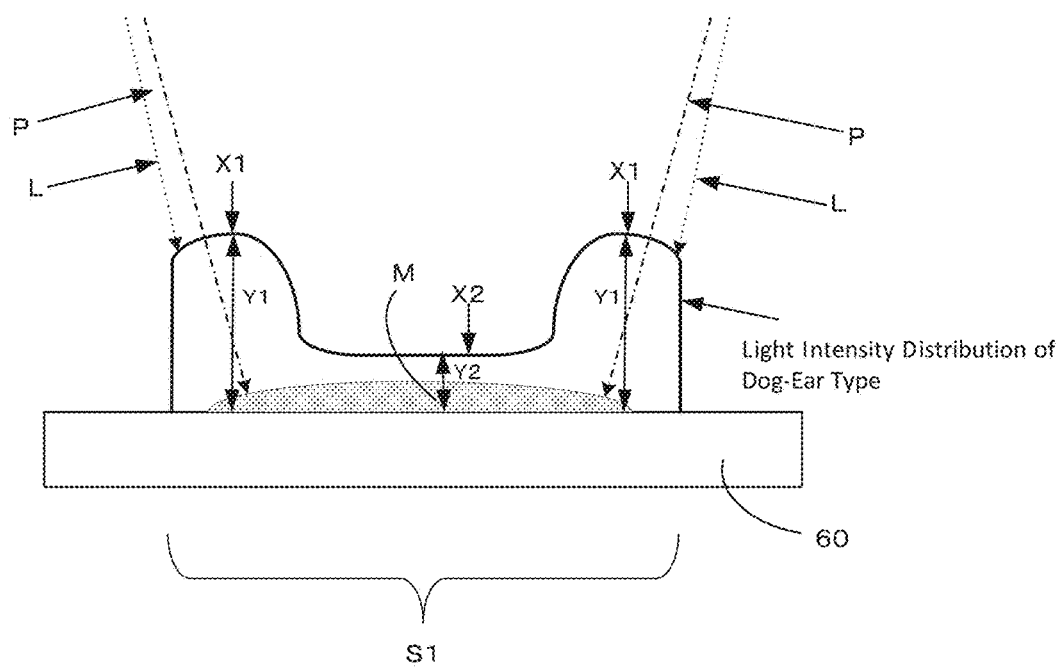
FIG. 3 schematically illustrates an aspect of supplying a laser beam and powder material to a workpiece with a laser additive manufacturing apparatus and a laser additive manufacturing method according to one embodiment.
Figure 4:
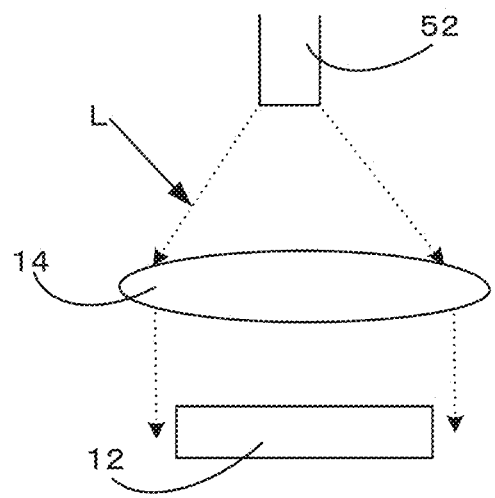
FIG. 4 schematically illustrates an example of an aspect of causing a laser beam to enter a diffractive optical element from a collimate lens.

First, a laser additive manufacturing apparatus according to one embodiment of the present disclosure will be described with referring to FIGS. 1A to 4. FIGS. 1A and 1B schematically illustrate configuration of a laser additive manufacturing apparatus according to one embodiment of the present disclosure. FIGS. 2A to 2C are graphs each schematically illustrating a light intensity distribution of a laser beam for irradiating a workpiece. FIG. 3 schematically illustrates an aspect of supplying a laser beam and powder material to a workpiece with a laser additive manufacturing apparatus and a laser additive manufacturing method according to one embodiment. FIG. 4 schematically illustrates an example of an aspect of causing a laser beam to enter a diffractive optical element from a collimate lens.

As illustrated in FIG. 1A, a laser additive manufacturing apparatus 2 according to the present embodiment includes a irradiation unit 10 that irradiates an irradiation region S with a laser beam L having a light intensity distribution converted by a diffractive optical element 12, and a head 30 having a material supplying unit 20 for supplying powder material P to the irradiation region S. The diffractive optical element is an optical component using diffraction of light.

In the irradiation region S, irradiation light from the irradiation unit 10 forms a substantially circular spot having a light intensity distribution in which light intensity in an outer peripheral portion is higher than light intensity in a central portion, and the central portion has predetermined light intensity.

The material supplying unit 20 is configured to supply powder material to the substantially circular spot.

The laser additive manufacturing apparatus 2 includes a movement mechanism 40 which relatively moves the head 30 and a workpiece 60. The present embodiment is configured such that the workpiece 60 is not moved and the head 30 is moved by the movement mechanism 40. The present disclosure is not limited thereto, and there is a case that the head 30 is not moved and the workpiece 60 is moved or a case that both the head 30 and the workpiece 60 are moved.

<Irradiation Unit 10>

In more details, the irradiation unit 10 includes a collimate lens 14 for receiving a laser beam transmitted from an optical fiber 52 to emit parallel light to the diffractive optical element (DOE) 12, and a condenser lens 16 for concentrating light emitted from the diffractive optical element (DOE) 12 on the irradiation region S.

The optical fiber 52 is connected to a laser beam source apparatus 50 at an input end, and emits a laser beam to the collimate lens 14 at an emission end 52A. The laser beam source apparatus 50 according to the present embodiment is a multiple mode laser apparatus, and specifically uses ytterbium fiber laser in which quartz fiber to which ytterbium ion ($Yb^{3+}$) is added serves as a laser medium. While the laser beam source apparatus 50 according to the present embodiment emits a laser beam with a wavelength of 1060 nm, the present disclosure is not limited thereto. For example, a laser beam with any wavelength can be used as long as the laser beam has a near-infrared wavelength of the order of 800 nm to 1080 nm. While it is exemplified that the laser beam source apparatus 50 has an output of 2 kW to 10 kW, the present disclosure is not limited thereto. As the laser beam source apparatus 50, any type of laser apparatus such as a YAG laser, and any other laser apparatus of a single mode or multiple modes may be used, as long as it is a laser beam source that emits a laser beam within a near-infrared range.

As the optical fiber 52, an optical fiber having a diameter of 0.3 mm is used according to an emission diameter of the laser beam source apparatus 50 that is a fiber laser. In the optical fiber 52, a laser beam emitted from the laser beam source apparatus 50 becomes a non-coherent high-output laser beam while traveling through a core of the optical fiber 52, and is emitted from the emission end 52A of the optical fiber 52. The diameter of the optical fiber is not limited to the above diameter, and any value is available according to an output diameter of the laser beam source apparatus 50.

The laser beam source apparatus 50 may have a case to be disposed in a housing of the head 30 and to be moved together with the housing by the movement mechanism 40 as well as a case to be disposed outside the housing and not to be moved. When the laser beam source apparatus 50 is not moved, the optical fiber 52 absorbs relative position change between the laser beam source apparatus 50 and the head 30.

The collimate lens 14 according to the present embodiment forms a laser beam emitted from the emission end 52A of the optical fiber 52 into parallel light and makes the parallel light enter the diffractive optical element (DOE) 12.

As the diffractive optical element (DOE) 12 according to the present embodiment, there is used an element, for example, made of a quartz substrate on which an irregular pattern is formed using a photolithography technique and a reactivity ion etching technique. When the diffractive optical element (DOE) 12 provided with the irregular pattern is irradiated with a parallel beam, a diffraction image having a light intensity distribution according to the irregular pattern can be obtained. The diffractive optical element (DOE) 12 has a substrate surface on which the irregular pattern is formed for obtaining a diffraction image having a light intensity distribution that forms a uniform temperature distribution.

The laser beam source apparatus 50 emits a laser beam that has a light intensity distribution of a Gaussian distribution as illustrated in FIG. 2A. When the diffractive optical element (DOE) 12 according to the present embodiment receives the laser beam having a light intensity distribution of a Gaussian distribution, a diffraction grating pattern is formed thereon such that the diffractive optical element (DOE) 12 emits a so-called top-hat type laser beam having a light intensity distribution with uniform light intensity as illustrated in FIG. 2B.

For example, a laser beam from the optical fiber 52 enters the collimate lens 14 to be collimated into parallel light with a diameter of 10 mm. This makes a laser beam with a diameter of 10 mm enter the diffractive optical element (DOE) 12, and light emitted from the diffractive optical element (DOE) 12 enters the condenser lens 16. Then, the irradiation region S is irradiated with a laser beam with an irradiation diameter of 4 mm from the condenser lens 16. That is, light emitted from the collimate lens 14 is enlarged by four times, and the irradiation region S is irradiated with the light. This magnification can be set to any value in accordance with a required irradiation diameter.

In the irradiation unit 10 according to the present embodiment, the collimate lens 14 is disposed such that a light diameter of a laser beam emitted from the collimate lens 14 is larger than an outer diameter of an incident surface of the diffractive optical element (DOE) 12 as illustrated in FIG. 4. According to this arrangement, even if the diffractive optical element (DOE) 12 has a diffraction grating pattern for forming a light intensity distribution of a top-hat type as illustrated in FIG. 2B when the diffractive optical element (DOE) 12 receives a laser beam having a Gaussian distribution as illustrated in FIG. 2A, the diffractive optical element (DOE) 12 can emit a laser beam having a light intensity distribution in which light intensity in an outer peripheral portion X1 is higher than light intensity in a central portion X2, and the central portion X2 has predetermined light intensity, as illustrated in FIG. 2C, The "light intensity distribution in which light intensity in an outer peripheral portion is higher than light intensity in a central portion, and the central portion has predetermined light intensity" can be referred to as a "light intensity distribution of a dog-ear type".

Light intensity Y1 in the outer peripheral portion X1 and light intensity Y2 in the central portion X2 have a ratio that can be set to a desired ratio by changing a ratio of a light diameter of a laser beam emitted from the collimate lens 14 to an outer diameter of the incident surface of the diffractive optical element (DOE) 12 (thus, a position of the collimate lens 14).

Basically, if a ratio of a light diameter of a laser beam entering the diffractive optical element (DOE) 12 to the outer diameter of the incident surface of the diffractive optical element (DOE) 12 becomes larger, a ratio (Y1/Y2) of the light intensity Y1 in the outer peripheral portion X1 to the light intensity Y2 in the central portion X2 becomes larger. On the contrary, if a ratio of a light diameter of a laser beam entering the diffractive optical element (DOE) 12 to the outer diameter of the incident surface of the diffractive optical element (DOE) 12 becomes smaller, a ratio (Y1/Y2) of the light intensity Y1 in the outer peripheral portion X1 to the light intensity Y2 in the central portion X2 becomes smaller.

As described above, the diffractive optical element (DOE) 12 has the diffraction grating pattern for forming a light intensity distribution of a top-hat type, and a light diameter of light to be emitted from the collimate lens 14 is set larger than an outer diameter of the incident surface of the diffractive optical element (DOE) 12. This enables obtaining the light intensity distribution (of a dog-ear type) in which light intensity in an outer peripheral portion is higher than light intensity in a central portion, and the central portion has predetermined light intensity without using a complex optical system.

However, the present disclosure is not limited thereto, and there may be used a diffractive optical element (DOE) 12 which has a diffraction pattern for forming a light intensity distribution (a dog-ear type) in which light intensity in an outer peripheral portion is higher than light intensity in a central portion, and the central portion has predetermined light intensity as illustrated in FIG. 2C, when receiving a laser beam having a Gaussian distribution as illustrated in FIG. 2A. In this case, a laser beam emitted from the collimate lens 14 can have a light diameter within the incident surface of the diffractive optical element (DOE) 12.

However, the present disclosure is not limited thereto. In the case of using the diffractive optical element (DOE) 12 having the diffraction pattern for forming a light intensity distribution of a dog-ear type, by making a light diameter of a laser beam to enter the diffractive optical element (DOE) 12 larger than the outer diameter of the incident surface of the diffractive optical element (DOE) 12, it can be obtain a light intensity distribution in which a ratio of the light intensity Y1 in the outer peripheral portion X1 to the light intensity Y2 in the central portion X2 increases.

The laser beam having a light intensity distribution of a dog-ear type, formed as described above, is concentrated in the irradiation region S by the condenser lens 16 to form a substantially circular spot. This is schematically illustrated in FIG. 3. As described below, the material supplying unit 20 supplies the powder material P into a substantially circular spot S1 having a light intensity distribution (of a dog-ear type) in which the light intensity Y1 in the outer peripheral portion X1 is higher than the light intensity Y2 in the central portion X2, and the central portion X2 has predetermined light intensity. The term "substantially circular" herein includes not only a true circle but also an oval shape or an elliptic shape, and an egg-like shape.

<Material Supplying Unit 20>

In more details, the material supplying unit 20 is configured such that powder material stored in a storage unit 22 flows through a supply pipe 24 together with a carrier gas to be supplied into the irradiation region S from an outlet nozzle 26 of the material supplying unit 20. As the powder material, there is available any metal material, such as stainless steel, nickel base alloy (Inconel), tungsten carbide composite material, copper alloy, brass, cobalt chromium molybdenum alloy, stellite, or tool steel. While a particle diameter of the powder material is 50 μm to 150 μm, for example, it is not limited thereto.

As the carrier gas, it is preferable to use an inert gas such as helium, argon, or nitrogen. In addition, for example, supplying a shield gas composed of the inert gas to the outside of the carrier gas containing the powder material enables suppressing oxidation of material in a laser additive manufacturing process As illustrated in FIG. 1B taken in the direction of arrows A-A of FIG. 1A, the outlet nozzle 26 includes eight outlet ports 26A that are disposed around an irradiation opening of the irradiation unit, thus outside an outer periphery of the condenser lens 16 of the irradiation unit 10. From these outlet ports 26A, the powder material P is supplied into the irradiation region S. The number of the outlet ports 26A is not limited to eight, and any other number of the outlet ports 26A can be provided.

The storage unit 22 may have a case to be disposed in the housing of the head 30 and to be moved together with the housing by the movement mechanism 40, as well as a case to be disposed outside the housing and not to be moved. When the storage unit 22 is not moved, a part of the supply pipe 24 is to be formed of a component that can be moved and deformed, such as a hose, to absorb relative position change between the storage unit 22 and the housing of the head 30.

As described above, the outlet ports 26A of the outlet nozzle 26 of the material supplying unit 20 are disposed outside the outer periphery of the condenser lens 16 of the irradiation unit 10 in the present embodiment, so that powder material is supplied to the substantially circular spot S1 in the irradiation region S from outside a laser beam emitted from the condenser lens 16 into the irradiation region S. That is, the material supplying unit 20 supplies the powder material from outside the condenser lens 16 to the substantially circular spot having a light intensity distribution (of a dog-ear type) in which light intensity in an outer peripheral portion is higher than light intensity in a central portion, and the central portion has predetermined light intensity, as illustrated in FIG. 3.

This prevents plasma from occurring before the powder material reaches a molten pool M, so that the laser beam is not blocked. In addition, it is unnecessary to bore a hole in the optical system (the condenser lens 16, etc.) to provide a supply port for material, so that manufacturing costs can be reduced and reliability of the optical system is also improved.

<Movement Mechanism 40>

In more details, as illustrated in FIG. 1A, the movement mechanism 40 can move the head 30 in a horizontal direction in the figure (refer to the hollow arrow) with an actuator 42 of the movement mechanism 40 while the workpiece 60 is fixed on a table. This enables the workpiece 60 to be scanned for laser additive manufacturing while the laser beam L and the powder material P are supplied to the workpiece 60. On the contrary, the table to which the workpiece 60 is attached can be moved in the horizontal direction in the figure with the actuator of the movement mechanism while the head 30 is fixed. In addition, both of the head 30 and the workpiece 60 can be moved.

The laser additive manufacturing apparatus 2 according to the present embodiment may be an individual apparatus as well as be incorporated in a machine tool. In the case that the laser additive manufacturing apparatus 2 is incorporated in a machine tool, a movement mechanism of the machine tool can also be used as the movement mechanism 40.

(Laser Additive Manufacturing Method According to One Embodiment)

Next, a laser additive manufacturing method according to one embodiment of the present disclosure will be briefly described with referring to FIGS. 1A to 4.

Firstly, the workpiece 60 is mounted on the table of the laser additive manufacturing apparatus 2, and the workpiece 60 is adjusted in position and height such that a region in which depositing is to be performed is positioned near the focus of the condenser lens 16. Subsequently, the laser beam source apparatus 50 is operated to irradiate the irradiation region S with a high-output laser beam passing through the optical fiber 52, the collimate lens 14, the diffractive optical element (DOE) 12, and the condenser lens 16 such that the irradiation region S is heated by the laser beam having a light intensity distribution of a dog-ear type. In that state, the powder material P is supplied to a substantially circular spot formed in the irradiation region S, and the head 30 is moved to start scanning. According to the laser additive manufacturing method as described above, a cumulative amount of heat after the laser beam passes becomes uniform regardless of position, so that deposited material is solidified by being uniformly heated and naturally cooled. In the irradiation region S, the depositing is performed according to the procedure described above.

As described above, the laser additive manufacturing apparatus 2 according to the present embodiment includes the irradiation unit 10 that irradiates the irradiation region S with the laser beam L having a light intensity distribution converted by the diffractive optical element (DOE) 12, the head 30 having the material supplying unit 20 for supplying the powder material P to the irradiation region S, and the movement mechanism 40 which relatively moves the head 30 and the workpiece 60, wherein in the irradiation region S, irradiation light L forms the substantially circular spot S1 having a light intensity distribution (of a dog-ear type) in which light intensity in the outer peripheral portion X1 is higher than light intensity in the central portion X2, and the central portion X2 has predetermined light intensity, and the material supplying unit 20 supplies the powder material to the substantially circular spot S1.

Likewise, the laser additive manufacturing method according to the present embodiment includes the steps of: causing a laser beam to enter the diffractive optical element (DOE) 12; irradiating the irradiation region S by emitting from the head 30 the laser beam L having a light intensity distribution converted by the diffractive optical element (DOE) 12; supplying the powder material P to the irradiation region S from the head 30; and relatively moving the head 30 and the workpiece 60, wherein in the irradiation region S, irradiation light L forms the substantially circular spot S1 having alight intensity distribution (of a dog-ear type) in which light intensity in the outer peripheral portion X1 is higher than light intensity in the central portion X2, and the central portion X2 has predetermined light intensity, and the powder material P is supplied to the substantially circular spot S1 from the head 30.

In laser additive manufacturing, a head supplies powder material to an irradiation region while irradiating the irradiation region with a laser beam, so that a molten pool of the material is formed. In this state, the head and a workpiece are relatively moved by a movement mechanism, so that a molten pool extending in the movement direction is formed.

At this time, when the laser beam emitted to the irradiation region forms a substantially circular spot having a light intensity distribution of a Gaussian distribution or a top-hat type, a cumulative amount of heat in a central portion of the irradiation region is larger than a cumulative amount of heat in an outer peripheral portion thereof. This causes the molten pool to have a non-uniform temperature distribution in which temperature in the central portion is high and temperature in the outer peripheral portion is low.

Accordingly, in the case of continuous additive manufacturing in which the head scans the workpiece, it causes a problem such as a difference in melting rate of the metal powder due to a temperature rise in the central portion of the molten pool, or occurrence of a void or a residual stress due to a difference in cooling rate of molten metal. In addition, in the case of using a laser beam with high energy density, supplied metal powder is irradiated with the laser beam just before being poured into a molten pool, thereby generating plasma that will block the laser beam, whereby causing a problem that a size of the molten pool is changed, and a uniform deposition cannot be formed.

The laser additive manufacturing apparatus 2 and the laser additive manufacturing method according to the respective present embodiments are each configured such that the irradiation light L forms the substantially circular spot S1 having a light intensity distribution (of a dog-ear type) in which light intensity in the outer peripheral portion X1 is higher than light intensity in the central portion X2, and the central portion X2 has predetermined light intensity. This enables a cumulative amount of heat in the central portion X2 and a cumulative amount of heat in the outer peripheral portion X1 to be more uniform, so that a temperature difference between a central portion and an outer peripheral portion in the molten pool M can be reduced.

As a result, even in the continuous additive manufacturing in which the head scans the workpiece 60 using a laser beam with high energy density, a uniform deposition in high quality can be formed. In addition, the powder material P is supplied to the substantially circular spot S1 of the irradiation light, so that a problem of blocking the laser beam with plasma can also be prevented, thereby enabling high efficiency depositing.

As described above, the laser additive manufacturing apparatus 2 according to the present embodiment enables a uniform deposition in high quality to be performed with high efficiency even in continuous additive manufacturing using a laser beam with high energy density.

If light intensity in a central portion of the irradiation region S in a light intensity distribution of a laser beam emitted to the irradiation region S comes extremely close to zero, a cumulative amount of heat in the central portion becomes smaller than a cumulative amount of heat in the outer peripheral portion. This causes the molten pool to have a nonuniform temperature distribution. Here, a ratio R of the light intensity Y2 in the central portion X2 to the light intensity Y1 in the outer peripheral portion X1 is expressed as follows: R=Y2/Y1.

Based on various simulation results, it is found that it is preferable to have a light intensity distribution having a value R that ranges 8% to 40%, and that it is more preferable to have a light intensity distribution having a value R that ranges 10% to 30%. The range of the light intensity distribution as described above enables a uniform deposition in high quality to be reliably formed.

(Laser Additive Manufacturing Apparatus According to Another Embodiment)

Figure 5:
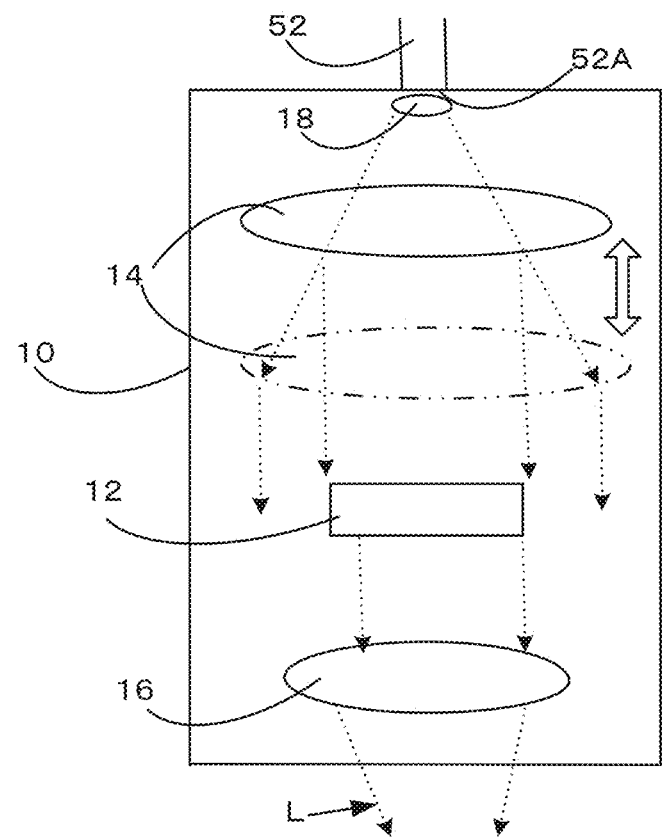
FIG. 5 schematically illustrates a laser additive manufacturing apparatus according to another embodiment of the present disclosure, particularly configuration of its irradiation unit.

Next, a laser additive manufacturing apparatus according to another embodiment of the present disclosure will be described with referring to FIG. 5. FIG. 5 schematically illustrates the laser additive manufacturing apparatus according to another embodiment of the present disclosure, particularly configuration of an irradiation unit thereof.

In an irradiation unit 10 of the present embodiment, a collimate lens 14 is movable in an optical axis direction.

In the present embodiment, an optical fiber 52 is provided with a lens 18 (e.g., a convex lens) having a surface to emit light with spreading the light at an emission end 52A. In the configuration as described above, when the collimate lens 14 is moved such as being away from the lens 18 (being closer to a diffractive optical element (DOE) 12), light diameter of a laser beam to be emitted from the collimate lens 14 can be increased. Meanwhile, when the collimate lens 14 is moved such as being closer to the lens 18 (being away from the diffractive optical element (DOE) 12), light diameter of a laser beam to be emitted from the collimate lens 14 can be reduced. As described above, when the collimate lens 14 is moved in the optical axis direction, light diameter of a laser beam entering the diffractive optical element (DOE) 12 can be changed.

As described above, when a light diameter of a laser beam to be emitted from the collimate lens 14 is set larger than an outer diameter of the incident surface of the diffractive optical element (DOE) 12, even in the case of using a diffraction grating pattern for forming a light intensity distribution of a top-hat type, there can be formed a laser beam having a light intensity distribution (of a dog-ear type) in which light intensity in an outer peripheral portion is higher than light intensity in a central portion, and the central portion has predetermined light intensity. In the present embodiment, a ratio of a light diameter of a laser beam to enter the diffractive optical element (DOE) 12 to the outer diameter of the incident surface of the diffractive optical element (DOE) 12 can be changed. This enables a profile of a light intensity distribution of a dog-ear type to be changed.

Basically, if light diameter of a laser beam entering the diffractive optical element (DOE) 12 becomes large (thus, if a ratio of a light diameter of incident light to the outer diameter of the incident surface of the diffractive optical element (DOE) 12 becomes large), it will increase a ratio (Y1/Y2) of the light intensity Y1 in the outer peripheral portion X1 to the light intensity Y2 in the central portion X2 in a light intensity distribution in the irradiation region S. On the contrary, if light diameter of a laser beam entering the diffractive optical element (DOE) 12 becomes small (thus, if a ratio of a light diameter of incident light to the outer diameter of the incident surface of the diffractive optical element (DOE) 12 becomes small), it will decrease a ratio (Y1/Y2) of the light intensity Y1 in the outer peripheral portion X1 to the light intensity Y2 in the central portion X2 in a light intensity distribution in the irradiation region S.

As described above, according to the present embodiment, a profile of a light intensity distribution of a laser beam to be emitted can easily be changed with a simple mechanism such as moving the collimate lens 14 in the optical axis direction.

As means for moving the collimate lens 14 in the optical axis direction, the collimate lens 14 can be moved not only by hand, but also by using an actuator or the like. In the case of moving the collimate lens 14 by using an actuator or the like, position change of the collimate lens 14 can be automatically controlled according to change in conditions in a depositing step.

(Laser Additive Manufacturing Apparatus According to Further Embodiment)

Figure 6:
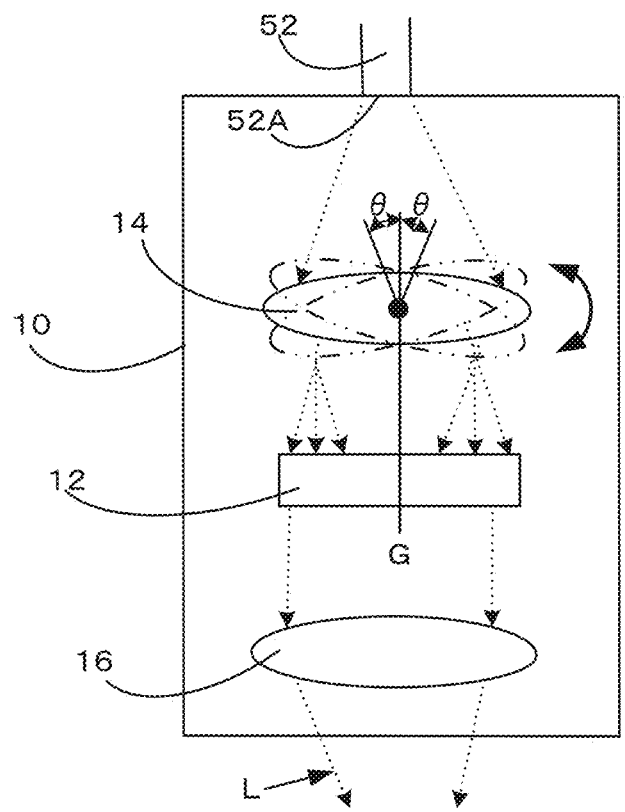
FIG. 6 schematically illustrates a laser additive manufacturing apparatus according to further embodiment of the present disclosure, particularly configuration of its irradiation unit.
Figure 7:
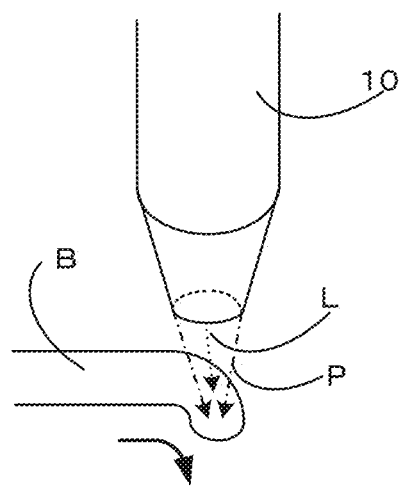
FIG. 7 is a perspective view schematically illustrating a state that depositing is performed at a corner portion with a laser additive manufacturing apparatus.

Next, a laser additive manufacturing apparatus according to further embodiment of the present disclosure will be described with referring to FIGS. 6 and 7. FIG. 6 schematically illustrates the laser additive manufacturing apparatus according to further embodiment of the present disclosure, particularly configuration of an irradiation unit thereof. FIG. 7 is a perspective view schematically illustrating a state that depositing is performed at a corner portion with a laser additive manufacturing apparatus.

As illustrated in FIG. 7, when depositing is performed at a corner portion with a laser additive manufacturing apparatus, if irradiating with a laser beam having a light intensity distribution of a bilaterally symmetrical dog-ear type, a cumulative amount of heat inside the corner becomes larger than a cumulative amount of heat outside the corner. This causes a molten pool to have a nonuniform temperature distribution in which temperature inside the corner is high and temperature outside the corner is low.

To cope with this problem, the present embodiment is configured such that an optical axis of a collimate lens 14 can be inclined from a normal direction of an incident surface of a diffractive optical element (DOE) 12 as illustrated in FIG. 6. This enables forming a light intensity distribution of a dog-ear type asymmetric to the optical axis. That is, this enables forming an asymmetric temperature distribution in which light intensity inside the corner is lower than light intensity outside the corner.

Changing an angle θ of inclination from the normal direction of the incident surface enables a degree of asymmetry to be arbitrarily adjusted. In addition, the optical axis of the collimate lens 14 can be inclined in both directions (+θ to −θ) from the normal direction of the incident surface, so that depositing in corners in any one of clockwise and counterclockwise directions can be performed.

As described above, a light intensity distribution asymmetric to the optical axis can be formed in irradiation light with a simple mechanism such as inclining the collimate lens 14. This enables forming an asymmetric temperature distribution in which light intensity inside a corner is lower than light intensity outside the corner, so that a temperature difference between inside and outside the corner can be effectively reduced.

As means for inclining the collimate lens 14 from the normal direction of the incident surface of the diffractive optical element (DOE) 12, the collimate lens 14 can be inclined not only by hand, but also by using an actuator or the like. When the collimate lens 14 is inclined by using an actuator or the like, it can be automatically controlled such that the collimate lens 14 is automatically inclined when reaching a corner at scanning process, and is automatically returned in place after passing through the corner.

EXAMPLE

Figure 8A:
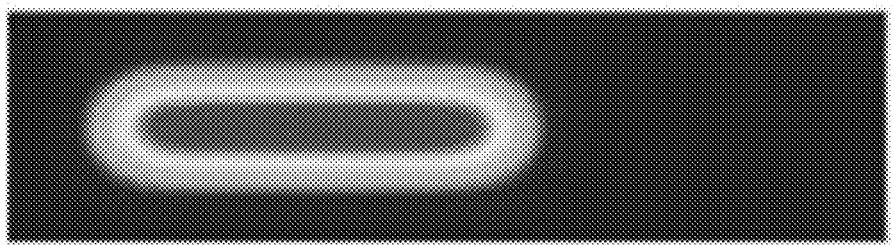
FIGS. 8A to 8C illustrate temperature distributions in respective irradiation regions each of which is scanned with the corresponding one of laser beams having light intensity distributions of a Gaussian distribution, a top-hat type, and a dog-ear type.
Figure 8B:
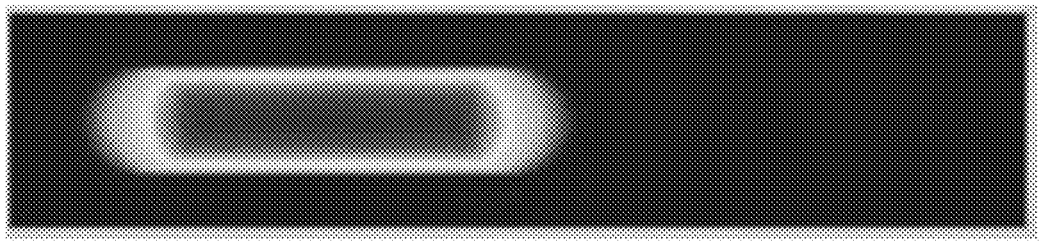
Figure 8C:
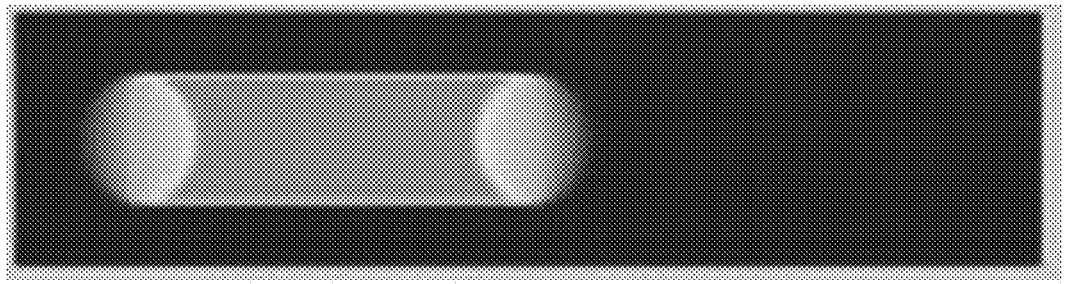

Next, the following simulation results will be described with referring to FIGS. 8A to 8C; (A) a temperature distribution in an irradiation region that is irradiated with a laser beam having a light intensity distribution of a Gaussian distribution and scanned; (B) a temperature distribution in an irradiation region that is irradiated with a laser beam having a light intensity distribution of a top-hat type and scanned; and (C) a temperature distribution in an irradiation region that is irradiated with a laser beam having a light intensity distribution of a dog-ear type and scanned as described in the embodiment above. FIGS. 8A to 8C illustrate temperature distributions in respective irradiation regions each of which is scanned with the corresponding one of laser beams having light intensity distributions of a Gaussian distribution, a top-hat type, and a dog-ear type. In each of the irradiation regions when being scanned, a darker-color portion has a higher temperature and a lighter-color portion has a lower temperature.

As illustrated in FIG. 8A, when an irradiation region is irradiated with a laser beam having a light intensity distribution of a Gaussian distribution and scanned, the irradiation region has a central portion with a temperature considerably lower than a temperature in a peripheral portion. As illustrated in FIG. 8B, when an irradiation region is irradiated with a laser beam having a light intensity distribution of a top-hat type and scanned, the irradiation region has a smaller temperature difference between the central portion and the peripheral portion as compared with the case of the Gaussian distribution, however, the central portion still has a temperature lower than a temperature in the peripheral portion.

In the case where scanning is performed by emitting a laser beam having a light intensity distribution of a dog-ear type, a simulation was performed in the case using a laser beam in which light intensity in a central portion ranges 10% to 30% of light intensity in an outer peripheral portion. By scanning the irradiation region while irradiating it with the laser beam, it was found that a temperature distribution was obtained in the irradiation region, in which a temperature in each of central and peripheral portions of the irradiation region was almost uniform, as illustrated in FIG. 8C. This proved that heating was performed to cause not only the amount of heat emitted to the workpiece to be uniform, but also the molten pool to have a uniform temperature. As a result, a uniform laser deposition with few voids and small residual stress was achieved.

As described above, by actually performing the simulation of the laser additive manufacturing, it can prove effects of the laser additive manufacturing apparatus 2 and the laser additive manufacturing method according to the above respective embodiments of the present disclosure.

While the embodiments and aspects of the present disclosure are described above, contents of the disclosure may be changed in details of the configuration, and combinations of elements, changes in order, or the like in the embodiments and aspects can be achieved without departing from the scope of claims of the present disclosure and the concept thereof.

DESCRIPTION OF REFERENCE SIGNS 2 laser additive manufacturing apparatus
10 irradiation unit
12 diffractive optical element
14 collimate lens
16 condenser lens
18 lens
20 material supplying unit
22 storage unit
24 supply pipe
26 outlet nozzle
26A outlet port
30 head
40 movement mechanism
42 actuator
50 laser beam source apparatus
52 optical fiber
52A emission end
60 workpiece
S irradiation region
S1 substantially circular spot
L laser beam
P powder material
M molten pool

What is claimed is:
1. A laser additive manufacturing apparatus comprising:
an irradiation unit that irradiates an irradiation region with a laser beam having a light intensity distribution converted by a diffractive optical element;
a head having a material supplying unit for supplying powder material to the irradiation region; and
a movement mechanism which relatively moves the head and a workpiece,
wherein in the irradiation region, irradiation light forms a substantially circular spot having a light intensity distribution in which light intensity in an outer peripheral portion is higher than light intensity in a central portion, and the central portion has predetermined light intensity, and
the material supplying unit supplies the powder material to the substantially circular spot, wherein the light intensity distribution is formed such that the light intensity in the central portion ranges 8% to 40% of the light intensity in the outer peripheral portion.

2. The laser additive manufacturing apparatus according to claim 1, wherein the light intensity distribution is formed such that the light intensity in the central portion ranges 10% to 30% of the light intensity in the outer peripheral portion.

3. The laser additive manufacturing apparatus according to claim 1, wherein
the irradiation unit includes a collimate lens for receiving a laser beam transmitted from an optical fiber to emit parallel light to the diffractive optical element,
the diffractive optical element has a diffraction grating pattern for forming a light intensity distribution of a top-hat type, and
a light diameter of light to be emitted from the collimate lens is set larger than an outer diameter of an incident surface of the diffractive optical element, to form the light intensity distribution in which the light intensity in the outer peripheral portion is higher than the light intensity in the central portion, and the central portion has predetermined light intensity.

4. The laser additive manufacturing apparatus according to claim 3, wherein the collimate lens is moved in an optical axis direction to change a profile of the light intensity distribution.

5. The laser additive manufacturing apparatus according to claim 3, wherein an optical axis of the collimate lens is inclined from a normal direction of the incident surface of the diffractive optical element to form the light intensity distribution asymmetric to the optical axis.

6. A laser additive manufacturing method comprising:
causing a laser beam to enter a diffractive optical element;
irradiating an irradiation region by emitting from a head the laser beam having a light intensity distribution converted by the diffractive optical element;
supplying powder material to the irradiation region from the head; and
relatively moving the head and a workpiece,
wherein in the irradiation region, irradiation light forms a substantially circular spot having a light intensity distribution in which light intensity in an outer peripheral portion is higher than light intensity in a central portion, and the central portion has predetermined light intensity, and
the powder material is supplied to the substantially circular spot from the head,
wherein the light intensity distribution is formed such that the light intensity in the central portion ranges 8% to 40% of the light intensity in the outer peripheral portion.

7. The laser additive manufacturing apparatus according to claim 2, wherein
the irradiation unit includes a collimate lens for receiving a laser beam transmitted from an optical fiber to emit parallel light to the diffractive optical element,
the diffractive optical element has a diffraction grating pattern for forming a light intensity distribution of a top-hat type, and
a light diameter of light to be emitted from the collimate lens is set larger than an outer diameter of an incident surface of the diffractive optical element, to form the light intensity distribution in which the light intensity in the outer peripheral portion is higher than the light intensity in the central portion, and the central portion has predetermined light intensity.

8. The laser additive manufacturing apparatus according to claim 4, wherein an optical axis of the collimate lens is inclined from a normal direction of the incident surface of the diffractive optical element to form the light intensity distribution asymmetric to the optical axis.

9. A laser additive manufacturing apparatus comprising:
an irradiation unit that irradiates an irradiation region with a laser beam having a light intensity distribution converted by a diffractive optical element;
a head having a material supplying unit for supplying powder material to the irradiation region; and
a movement mechanism which relatively moves the head and a workpiece,
wherein in the irradiation region, irradiation light forms a substantially circular spot having a light intensity distribution in which light intensity in an outer peripheral portion is higher than light intensity in a central portion, and the central portion has predetermined light intensity, and
the material supplying unit supplies the powder material to the substantially circular spot, wherein:
the irradiation unit includes a collimate lens for receiving a laser beam transmitted from an optical fiber to emit parallel light to the diffractive optical element,
the diffractive optical element has a diffraction grating pattern for forming a light intensity distribution of a top-hat type, and
a light diameter of light to be emitted from the collimate lens is set larger than an outer diameter of an incident surface of the diffractive optical element, to form the light intensity distribution in which the light intensity in the outer peripheral portion is higher than the light intensity in the central portion, and the central portion has predetermined light intensity.

* * * * *